US011182223B2

(12) United States Patent
Walters et al.

(10) Patent No.: US 11,182,223 B2
(45) Date of Patent: *Nov. 23, 2021

(54) DATASET CONNECTOR AND CRAWLER TO IDENTIFY DATA LINEAGE AND SEGMENT DATA

(71) Applicant: CAPITAL ONE SERVICES, LLC, McLean, VA (US)

(72) Inventors: Austin Walters, Savoy, IL (US); Mark Watson, Urbana, IL (US); Galen Rafferty, Mahomet, IL (US); Anh Truong, Champaign, IL (US); Jeremy Goodsitt, Champaign, IL (US); Vincent Pham, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/577,010

(22) Filed: Sep. 20, 2019

(65) Prior Publication Data

US 2020/0012666 A1  Jan. 9, 2020

Related U.S. Application Data

(63) Continuation of application No. 16/251,867, filed on Jan. 18, 2019, now Pat. No. 10,459,954.
(Continued)

(51) Int. Cl.
*G06F 9/00* (2006.01)
*G06F 9/54* (2006.01)
(Continued)

(52) U.S. Cl.
CPC .............. *G06F 9/541* (2013.01); *G06F 8/71* (2013.01); *G06F 9/54* (2013.01); *G06F 9/547* (2013.01);
(Continued)

(58) Field of Classification Search
None
See application file for complete search history.

(56) References Cited

U.S. PATENT DOCUMENTS 8,375,032 B2\* 2/2013 Birdwell ............. G06Q 50/265
707/737
8,392,418 B2\* 3/2013 Birdwell ............. G06K 9/6253
707/737

(Continued)

FOREIGN PATENT DOCUMENTS

WO    WO 2018/079020 A1    5/2018

OTHER PUBLICATIONS

Rostin et al., "A Machine Learning Approach to Foreign Key Discovery," Jun. 28, 2009, XP055543312, Retrieved from the Internet: URL:http://citeseerx.ist_psu.edu/viewdoc/download?doi=10_1.1_438.9288&rep=rep1&type=pdf [retrieved on Jan. 16, 2019].

(Continued)

*Primary Examiner* — Farhan M Syed
(74) *Attorney, Agent, or Firm* — Finnegan, Henderson, Farabow, Garrett & Dunner, LLP

(57) ABSTRACT

Systems and methods for connecting datasets are disclosed. For example, a system may include a memory unit storing instructions and a processor configured to execute the instructions to perform operations. The operations may include receiving a plurality of datasets and a request to identify a cluster of connected datasets among the received plurality of datasets. The operations may include selecting a dataset. In some embodiments, the operations include identifying a data schema of the selected dataset and determining a statistical metric of the selected dataset. The operations may include identifying foreign key scores. The operations may include generating a plurality of edges between the datasets based on the foreign key scores, the data schema, and the statistical metric. The operations may include segmenting and returning datasets based on the plurality of edges.

20 Claims, 6 Drawing Sheets

Related U.S. Application Data

(60) Provisional application No. 62/694,968, filed on Jul. 6, 2018.

(51) Int. Cl.

| | | |
|---|---|---|
| G06N 20/00 | (2019.01) | |
| G06F 17/16 | (2006.01) | |
| G06N 3/04 | (2006.01) | |
| G06F 11/36 | (2006.01) | |
| G06N 3/08 | (2006.01) | |
| G06F 21/62 | (2013.01) | |
| G06N 5/04 | (2006.01) | |
| G06F 17/15 | (2006.01) | |
| G06T 7/194 | (2017.01) | |
| G06T 7/254 | (2017.01) | |
| G06T 7/246 | (2017.01) | |
| G06F 16/2455 | (2019.01) | |
| G06F 16/22 | (2019.01) | |
| G06F 16/28 | (2019.01) | |
| G06F 16/906 | (2019.01) | |
| G06F 16/93 | (2019.01) | |
| G06F 16/903 | (2019.01) | |
| G06F 16/9038 | (2019.01) | |
| G06F 16/9032 | (2019.01) | |
| G06F 16/25 | (2019.01) | |
| G06F 16/335 | (2019.01) | |
| G06F 16/242 | (2019.01) | |
| G06F 16/248 | (2019.01) | |
| G06F 30/20 | (2020.01) | |
| G06F 40/166 | (2020.01) | |
| G06F 40/117 | (2020.01) | |
| G06F 40/20 | (2020.01) | |
| G06F 8/71 | (2018.01) | |
| G06F 17/18 | (2006.01) | |
| G06F 21/55 | (2013.01) | |
| G06F 21/60 | (2013.01) | |
| G06K 9/03 | (2006.01) | |
| G06K 9/62 | (2006.01) | |
| G06K 9/66 | (2006.01) | |
| G06K 9/68 | (2006.01) | |
| G06K 9/72 | (2006.01) | |
| G06N 7/00 | (2006.01) | |
| G06Q 10/04 | (2012.01) | |
| G06T 11/00 | (2006.01) | |
| H04L 29/06 | (2006.01) | |
| H04L 29/08 | (2006.01) | |
| H04N 21/234 | (2011.01) | |
| H04N 21/81 | (2011.01) | |
| G06N 5/00 | (2006.01) | |
| G06N 5/02 | (2006.01) | |

(52) U.S. Cl.
CPC ...... *G06F 11/3608* (2013.01); *G06F 11/3628* (2013.01); *G06F 11/3636* (2013.01); *G06F 16/2237* (2019.01); *G06F 16/2264* (2019.01); *G06F 16/248* (2019.01); *G06F 16/2423* (2019.01); *G06F 16/24568* (2019.01); *G06F 16/254* (2019.01); *G06F 16/258* (2019.01); *G06F 16/283* (2019.01); *G06F 16/285* (2019.01); *G06F 16/288* (2019.01); *G06F 16/335* (2019.01); *G06F 16/906* (2019.01); *G06F 16/9038* (2019.01); *G06F 16/90332* (2019.01); *G06F 16/90335* (2019.01); *G06F 16/93* (2019.01); *G06F 17/15* (2013.01); *G06F 17/16* (2013.01); *G06F 17/18* (2013.01); *G06F 21/552* (2013.01); *G06F 21/60* (2013.01); *G06F 21/6245* (2013.01); *G06F 21/6254* (2013.01); *G06F 30/20* (2020.01); *G06F 40/117* (2020.01); *G06F 40/166* (2020.01); *G06F 40/20* (2020.01); *G06K 9/036* (2013.01); *G06K 9/6215* (2013.01); *G06K 9/6218* (2013.01); *G06K 9/6231* (2013.01); *G06K 9/6232* (2013.01); *G06K 9/6253* (2013.01); *G06K 9/6256* (2013.01); *G06K 9/6257* (2013.01); *G06K 9/6262* (2013.01); *G06K 9/6265* (2013.01); *G06K 9/6267* (2013.01); *G06K 9/6269* (2013.01); *G06K 9/6277* (2013.01); *G06K 9/66* (2013.01); *G06K 9/6885* (2013.01); *G06K 9/72* (2013.01); *G06N 3/04* (2013.01); *G06N 3/0445* (2013.01); *G06N 3/0454* (2013.01); *G06N 3/08* (2013.01); *G06N 3/088* (2013.01); *G06N 5/00* (2013.01); *G06N 5/02* (2013.01); *G06N 5/04* (2013.01); *G06N 7/00* (2013.01); *G06N 7/005* (2013.01); *G06N 20/00* (2019.01); *G06Q 10/04* (2013.01); *G06T 7/194* (2017.01); *G06T 7/246* (2017.01); *G06T 7/248* (2017.01); *G06T 7/254* (2017.01); *G06T 11/001* (2013.01); *H04L 63/1416* (2013.01); *H04L 63/1491* (2013.01); *H04L 67/306* (2013.01); *H04L 67/34* (2013.01); *H04N 21/23412* (2013.01); *H04N 21/8153* (2013.01)

(56) References Cited

U.S. PATENT DOCUMENTS

| | | | | |
|---|---|---|---|---|
| 2002/0103793 | A1* | 8/2002 | Koller | G06F 16/2462 |
| 2008/0270363 | A1* | 10/2008 | Hunt | G06F 16/2462 |
| 2008/0288889 | A1* | 11/2008 | Hunt | G06Q 30/02 |
| | | | | 715/810 |
| 2009/0018996 | A1* | 1/2009 | Hunt | G06F 16/2264 |
| 2010/0033221 | A1 | 12/2010 | Birdwell et al. | |
| 2010/0332210 | A1* | 12/2010 | Birdwell | G06F 16/2228 |
| | | | | 703/22 |
| 2010/0332474 | A1* | 12/2010 | Birdwell | G06K 9/6253 |
| | | | | 707/737 |
| 2013/0124526 | A1* | 5/2013 | Birdwell | G06F 16/2228 |
| | | | | 707/737 |
| 2013/0015931 | A1 | 6/2013 | Birdwell et al. | |
| 2013/0159309 | A1* | 6/2013 | Birdwell | G06F 16/2453 |
| | | | | 707/737 |
| 2013/0159310 | A1* | 6/2013 | Birdwell | G06F 16/2453 |
| | | | | 707/737 |
| 2014/0201126 | A1* | 7/2014 | Zadeh | A61B 5/165 |
| | | | | 706/52 |
| 2015/0032761 | A1* | 1/2015 | Pasternack | G06F 17/18 |
| | | | | 707/748 |
| 2016/0092476 | A1* | 3/2016 | Stojanovic | G06F 3/04847 |
| | | | | 707/805 |
| 2016/0132787 | A1* | 5/2016 | Drevo | G06N 20/10 |
| | | | | 706/12 |
| 2017/0316084 | A1 | 11/2017 | Pogrebtsov et al. | |
| 2018/0173730 | A1* | 6/2018 | Copenhaver | G06N 20/00 |
| 2018/0204111 | A1* | 7/2018 | Zadeh | G06K 9/3233 |

OTHER PUBLICATIONS

Berlin et al., "Database Schema Matching Using Machine Learning with Feature Selection," Electronic Publishing, Artistic Imaging, and Digital Typography; [Lecture Notes in Computer Science, ISSN 0302-9743], Springer Verlag, DE, vol. 2348, May 27, 2002 (May 27, 2002), pp. 452-466, XP002379937, ISBN: 978-3-540-24128-7.

\* cited by examiner

DATASET CONNECTOR AND CRAWLER TO IDENTIFY DATA LINEAGE AND SEGMENT DATA

CROSS REFERENCE TO RELATED APPLICATIONS

This application is a continuation of U.S. patent application Ser. No. 16/251,867, filed on Jan. 18, 2019, currently pending, which claims the benefit of U.S. Provisional Application No. 62/694,968, filed Jul. 6, 2018. The disclosures of the above-referenced applications are incorporated herein by reference in their entireties.

This application also relates to U.S. patent application Ser. No. 16/151,385 filed Oct. 4, 2018, and titled Data Model Generation Using Generative Adversarial Networks, the disclosure of which is also incorporated herein by reference in its entirety.

BACKGROUND

Big data involves collecting and analyzing large scale, complex datasets at high velocity. Big data may involve datasets of such vast scale that spotting trends or outcomes requires advanced application of analytic data science or knowledge processing (e.g., artificial intelligence). Big data may include training machine learning algorithms, including neural network models, to predict or classify data. At the outset of a big data analysis process, data processing systems must identify which data to analyze to serve a particular analysis goal or topic (i.e., a desired outcome). To meet an analysis goal, data processing systems may face challenges distinguishing datasets relevant to that goal from irrelevant datasets. Further, data processing systems may be unable to distinguish actual data from synthetic data. Problems may arise from data inundation, data redundancy, unknown data lineage, and/or unknown data properties. That is, big data faces challenges arising from collecting too much data that becomes costly to analyze, collecting overlapping redundant data, and collecting unclassified, unmapped, or unlabeled data.

In the field of big data, individual or institutional data processing systems may collect large amounts of data from communication systems, user devices, health systems, transactional systems, transportation systems, medical systems, biological systems, climate systems, environmental systems, educational systems, demographic monitoring systems, water systems, government systems, or other systems. These data may address data analysis goals in science, engineering, human health, demographics, finance, business, medicine, human behavior, education, governance, regulation, environmental management, or other topics. Data processing systems may collect these data continuously or periodically. For example, a data processing system may collect hourly weather data, user device data, and demographic data to determine optimal traffic control patterns in a region. In addition, data processing systems may acquire discrete blocks of data from third parties (i.e., data dumps). For example, a merchant may purchase datasets that include hundreds of millions of transaction records and seek to identify consumer trends related to particular products.

Problems accompany such large-scale data collection efforts. Data processing systems may redundantly gather the same data multiple times from the same or different source. Further, data processing systems may gather data that produces no additional benefit for data analysis goals. In many cases, received data may be unlabeled, with unknown data schema or other data properties. A data processing system may not receive information indicating whether received data comprises actual data or synthetic data. As data processing systems or human data managers change, the system or human managers may lose or forget properties of datasets that the system collects. In some cases, the need for these data may change as data analysis goals change, so that the amount or frequency of collected data may no longer be appropriate.

Conventional approaches to big data analysis involve applying machine learning models or statistical models to received datasets for data prediction or data classification. For example, big data may involve predicting or classifying data using neural network models (e.g., recurrent neural networks, convolutional neural networks), feed forward models, deep learning models (e.g., long short-term memory models), random forest models, regression models, or other models. However, these approaches often do not include upfront data management approaches to address data collection and data analysis inefficiencies noted above. Instead, faced with data inundation, data redundancy, unknown data lineage, and/or unknown data properties, conventional approaches typically merely retrain models with each newly received dataset.

Thus, conventional approaches lead to wastefully escalating computations. Conventional approaches often fail to identify datasets relevant to a data analysis goal prior to analysis. In some cases, conventional systems cannot determine which datasets are related (connected), which overlap, which comprise actual data, or which comprise synthetic data. As a result, conventional data processing systems do not identify useful data collection efforts versus wasteful efforts, leading to inefficient resource use during data collection.

This data collection inefficiency leads to downstream data analysis inefficiencies. Conventional data processing systems waste computing resources analyzing data that is not useful to address a particular need or that is redundant (i.e., analyzing data that the system already analyzed). Conventional systems may discard or ignore data because the data lack labels or have an unknown data schema, thereby wasting of computing resources. Thus, conventional systems may waste valuable computing resources collecting data that no longer serve any data analysis goals or by collecting useful information that goes unanalyzed. Alternatively, conventional systems may collect data sub-optimally, i.e., these systems may fail to recognize that an increase in the amount or frequency of data collected may better serve a data analysis goal.

Therefore, in view of the shortcomings and problems with existing methods, there is a need for improved systems and methods of data processing for processing big data with data redundancy, unknown data lineage, and/or unknown data properties. New approaches to data processing that efficiently collect and analyze data by identifying connected datasets, distinguish actual data from synthetic data, and identify data lineage are needed.

SUMMARY

The disclosed embodiments provide unconventional methods and systems for connecting (clustering) datasets to identify data lineage and segment data. The disclosed systems and methods are implemented using a combination of conventional hardware and software as well as specialized hardware and software, such as a machine constructed and/or programmed specifically for performing functions associated with the disclosed method steps.

Consistent with the present embodiments, a system for connecting datasets is disclosed. The system may include one or more memory units storing instructions and one or more processors configured to execute the instructions to perform operations. The operations may include receiving, by a dataset connector system, a plurality of datasets and a request to identify a cluster of connected datasets among the received plurality of datasets. The operations may include selecting a dataset. In some embodiments, the operations include identifying, by a data profiling model, a data schema of the selected dataset and determining a statistical metric of the selected dataset. The data profiling model may identify a plurality of candidate foreign keys of the selected dataset and determining a respective foreign key score for individual ones of the plurality of candidate foreign key. The operations may include generating, by a data mapping model, a plurality of edges between the selected dataset and the received plurality of datasets based on the foreign key scores, the data schema, and the statistical metric. In some embodiments, the operations include segmenting, by a data classification model, a cluster of connected datasets comprising the selected dataset based on the plurality of edges. The operations may include returning, by the dataset connector, the segmented cluster of connected datasets.

Consistent with the present embodiments, a method for connecting datasets is disclosed. The method may include receiving, by a dataset connector system, a plurality of datasets and a request to identify a cluster of connected datasets among the received plurality of datasets. The method may include selecting a dataset. In some embodiments, the method includes identifying, by a data profiling model, a data schema of the selected dataset and determining a statistical metric of the selected dataset. The data profiling model may identify a plurality of candidate foreign keys of the selected dataset and determining a respective foreign key score for individual ones of the plurality of candidate foreign key. The method may include generating, by a data mapping model, a plurality of edges between the selected dataset and the received plurality of datasets based on the foreign key scores, the data schema, and the statistical metric. In some embodiments, the method includes segmenting, by a data classification model, a cluster of connected datasets comprising the selected dataset based on the plurality of edges. The operations may include returning, by the dataset connector, the segmented cluster of connected datasets.

Consistent with other disclosed embodiments, non-transitory computer readable storage media may store program instructions, which are executed by at least one processor device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Disclosed embodiments improve data processing by identifying connected datasets, synthetic and actual data, and data lineage in datasets with unknown properties. To achieve these unconventional improvements in data processing, disclosed embodiments include one or more memory units for storing instructions and one or more processors configured to execute the instructions to perform operations. The embodiments provide unconventional systems and methods for connecting datasets, identifying synthetic and actual data, identifying data lineage, and segmenting data that improve on conventional data processing systems and methods. Accordingly, the embodiments improve efficiency and improve analysis results by leading to optimal data collection and analysis strategies.

Systems and methods of disclosed embodiments may involve datasets comprising actual data reflecting real world conditions, events, or measurement. In some embodiments, disclosed systems and methods involve synthetic data (e.g., anonymized actual data or fake data). Datasets may be fully or partially synthetic. Datasets of disclosed embodiments may have a respective data schema (i.e., structure), including a data type, key-value pair, a label, metadata, a field, a relationship, a view, an index, a package, a procedure, a function, a trigger, a sequence, a synonym, a link, a directory, a queue, or the like. Datasets of the embodiments may contain foreign keys (i.e., data elements that appear in multiple datasets and may be used to cross-reference data and determine relationships between datasets). Foreign keys may be unique (e.g., a personal identifier) or shared (e.g., a postal code). Datasets of the embodiments may be clustered (e.g., a group of datasets may share common features, such as overlapping data, shared statistical properties, or the like). Clustered datasets may share hierarchical relationships (i.e., data lineage).

Reference will now be made in detail to exemplary embodiments, examples of which are illustrated in the accompanying drawings and disclosed herein. Wherever convenient, the same reference numbers will be used throughout the drawings to refer to the same or like parts. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Figure 1:
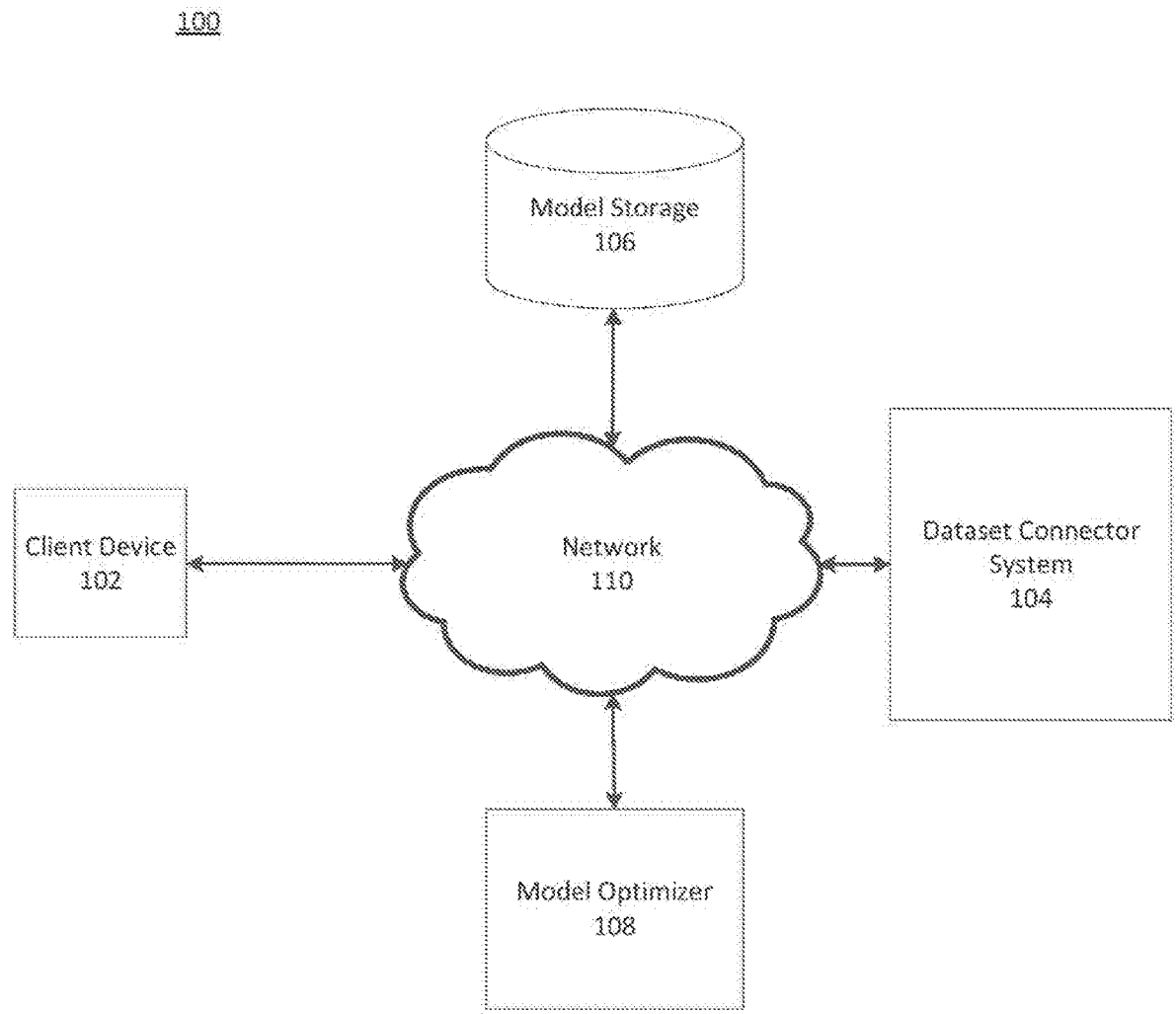
FIG. 1 is a diagram of an exemplary system for data processing.

FIG. 1 is a diagram of exemplary system 100 for data processing. As shown, system 100 may include a client device 102, a dataset connector system 104, a model storage 106, and a model optimizer 108. Components of system 100 may be connected to each other through a network 110.

In some embodiments, aspects of system 100 may be implemented on one or more cloud services designed to generate (spin-up) one or more ephemeral container instances in response to event triggers, assign one or more tasks to a container instance, and terminate (spin-down) a container instance upon completion of a task. By implementing methods using cloud services, disclosed systems efficiently provision resources based on demand and provide security advantages because the ephemeral container instances may be closed and destroyed upon completion of a task. That is, the container instances prevent attempts to access the container and do not permit access from outside using terminals or remote shell tools like SSH, RTP, FTP, or Curl, for example. Further, terminating container instances may include destroying data, thereby protecting sensitive data. Destroying data can provide security advantages because it may involve permanently deleting data (e.g., overwriting data) and associated file pointers.

As will be appreciated by one skilled in the art, the components of system 100 can be arranged in various ways and implemented with any suitable combination of hardware, firmware, and/or software, as applicable. For example, as compared to the depiction in FIG. 1, system 100 may include a larger or smaller number client devices, dataset connector systems, model storage, or model optimizers. In addition, system 100 may further include other components or devices not depicted that perform or assist in the performance of one or more processes, consistent with the disclosed embodiments. The exemplary components and arrangements shown in FIG. 1 are not intended to limit the disclosed embodiments.

Referring to FIG. 1, client device 102 may include one or more memory units and one or more processors configured to perform operations consistent with disclosed embodiments. In some embodiments, client device 102 may include hardware, software, and/or firmware modules. Client device 102 may be a storage device, a terminal, a kiosk, a mobile device, a tablet, a personal computer, a server, a server cluster, or a specialized device configured to perform methods according to disclosed embodiments, or the like. An exemplary embodiment of client device 102 is described below in greater detail.

Client device 102 may be connected to network 110 or directly connected to dataset connector system 104 (not shown). For example, client device 102 may connect to network 110 (or other component of system 100) by at least one of a wireless connection or a wired connection. In some embodiments, the wireless connection may include at least one of a Wi-Fi connection, a Bluetooth connection, a Li-Fi connection, an optical wireless connection, a Near Field Communication (NFC) connection, or another wireless connection. In some embodiments, the wired connection includes at least one of a Universal Serial Bus (USB) connection, a Firewire connection, an ethernet connection, or another cable connection.

Referring again to FIG. 1, system 100 may include dataset connector system 104. In some embodiments, some or all components of dataset connector system 104 may be hosted on one or more servers, one or more clusters of servers, or one or more cloud services. Dataset connector system 104 may include processors and memory units, the processors configured to perform operations consistent with disclosed embodiments. Dataset connector system 104 may be connected to network 110 and may additionally be connected to client device 102, model storage 106, and/or model optimizer 108. Dataset connector system 104 is described in greater detail below. In some embodiments, dataset connector system 104 includes model optimizer 108 (not shown). Alternatively, in some embodiments, dataset connector system 104 is a component of model optimizer 108 (not shown).

System 100 may include model storage 106. In some embodiments, some or all components of model storage 106 may be hosted on one or more servers, one or more clusters of servers, or one or more cloud services. Dataset connector system 104 may include processors and memory units, the processors configured to perform operations consistent with disclosed embodiments. Model storage 106 may be connected to network 110 and may additionally be directly connected to dataset connector system 104 (not shown). In some embodiments, model storage 106 is a component of dataset connector system 104 (not shown).

Model storage 106 can include one or more databases configured to store data models (e.g., machine learning models or statistical models) and descriptive information of the data models. Model storage 106 can be configured to provide information regarding available data models to a user or another system. The databases can include cloud-based databases, cloud-based buckets, or on-premises databases. The information can include model information, such as the type and/or purpose of the model and any measures of classification error. In some embodiments, model storage 106 is a component of dataset connector 104 (not shown).

System 100 may include model optimizer 108. Model optimizer 108 can include one or more computing systems configured to manage training of data models for system 100, consistent with disclosed embodiments. Model optimizer 108 can be configured to generate models for export to other components of system 100 or to other components not shown.

Model optimizer 108 can be configured to generate models based on instructions received from a user or another system. For example, model optimizer 108 can be configured to receive a visual (graphical) depiction of a machine learning model and parse that graphical depiction into instructions for creating and training a corresponding neural network. Model optimizer 108 can be configured to select model training parameters. This selection can be based on model performance feedback received from another component of system 100. Model optimizer 108 can be configured to provide trained models and descriptive information concerning the trained models to model storage 106.

Model optimizer 108 may be configured to train machine learning models by optimizing model parameters and/or hyperparameters (hyperparameter tuning) using an optimization technique, consistent with disclosed embodiments. The optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. Model optimizer 108 is configured to optimize statistical models using known optimization techniques As shown in FIG. 1, at least one of a client device 102, a dataset connector system 104, a model storage 106, and a model optimizer 108 may connect to network 110. Network 110 may be a public network or private network and may include, for example, a wired or wireless network, including, without limitation, a Local Area Network, a Wide Area Network, a Metropolitan Area Network, an IEEE 1002.11 wireless network (e.g., "Wi-Fi"), a network of networks (e.g., the Internet), a land-line telephone network, or the like. In some embodiments, network 110 may be a secure network and require a password to access the network.

Figure 2:
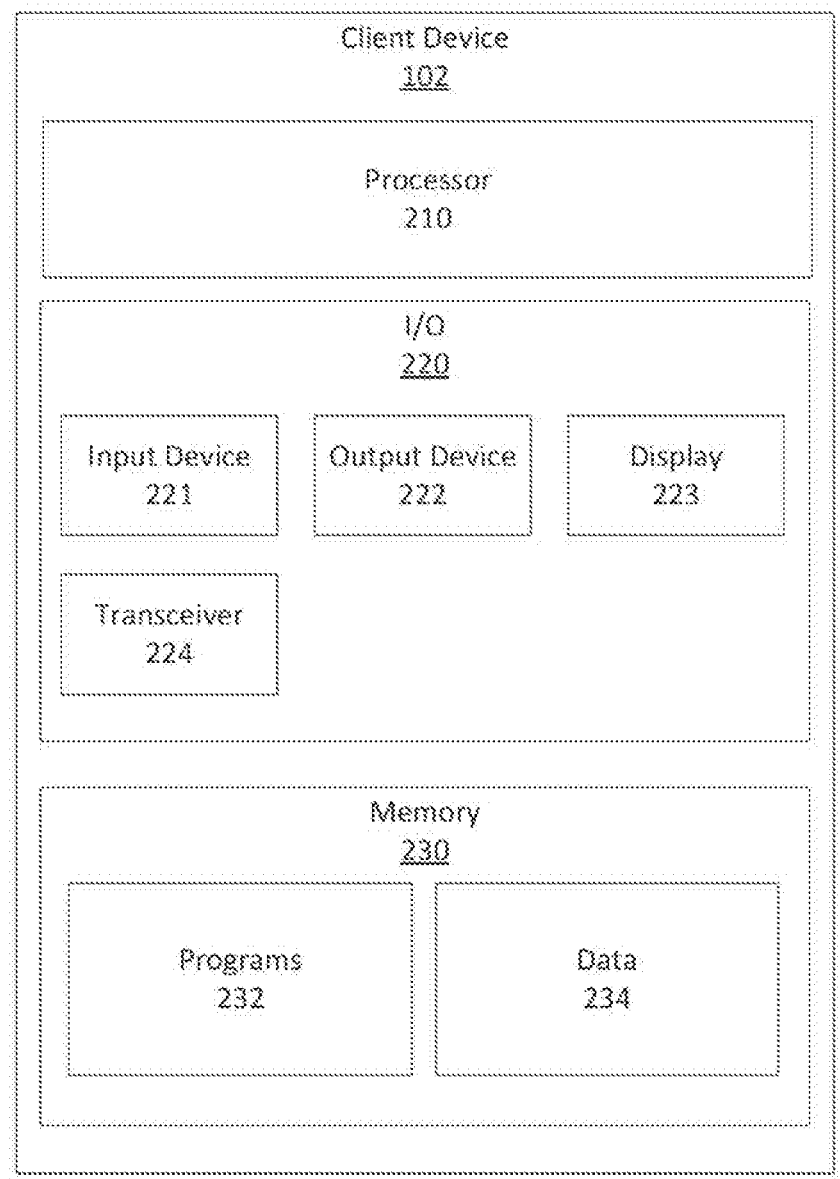
FIG. 2 is a diagram of an exemplary client device, consistent with disclosed embodiments.

FIG. 2 is a diagram of exemplary client device 102, consistent with disclosed embodiments. Client device 102 may be a storage device, a terminal, a kiosk, a mobile device, a tablet, a personal computer, a server, a server cluster, a specialized device configured to perform methods according to disclosed embodiments, or the like.

As depicted in FIG. 2, client device 102 may include one or more processors 210, input/output units (I/O devices) 220, and one or more memory units 230. FIG. 2 is an exemplary configuration of client device 102. As will be appreciated by one skilled in the art, the components and arrangement of components included in client device 102 may vary. For example, as compared to the depiction in FIG. 2, client device 102 may include a larger or smaller number of processors 210, I/O devices 220, or memory units 230. In addition, client device 102 may further include other components or devices not depicted that perform or assist in the performance of one or more processes consistent with the disclosed embodiments. The components and arrangements shown in FIG. 2 are not intended to limit the disclosed embodiments, as the components used to implement the disclosed processes and features may vary.

Processor 210 may be known computing processors, including a microprocessor. Processor 210 may constitute a single-core or multiple-core processor that executes parallel processes simultaneously. For example, processor 210 may be a single-core processor configured with virtual processing technologies. In certain embodiments, processor 210 may use logical processors to simultaneously execute and control multiple processes. Processor 210 may implement virtual machine technologies, or other known technologies to provide the ability to execute, control, run, manipulate, store, etc., multiple software processes, applications, programs, etc. In another embodiment, processor 210 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor(s) 210. Processor 210 may execute various instructions stored in memory 230 to perform various functions of the disclosed embodiments described in greater detail below. Processor 210 is configured to execute functions written in one or more known programming languages.

Referring again to FIG. 2, I/O devices 220 may be components of an interface, such as a user interface. I/O devices 220 may include an input device 221, an output device 222, a display 223, and/or a transceiver 224. I/O devices 220 may include other I/O devices, not depicted, that perform or assist in the performance of one or more processes consistent with disclosed embodiments. In some embodiments, some or all of I/O devices 220 may be mounted to client device 102. In some embodiments, some or all of I/O devices 220 may be components of stand-alone devices communicatively coupled to client device 102.

Input device 221 may include at least one of a touchpad, a touch screen, a keyboard, a mouse, a button, a dial, a knob, a switch, a microphone, a location sensor, a camera, a video camera, a fingerprint scanner, a retinal scanner, a biometric input device, an ultrasonic scanner, or the like. As will be appreciated by one of skill in the art, input device 221 may be any device capable of receiving inputs, including user inputs, to perform or assist in performing methods consistent with disclosed embodiments.

Output device 222 may include any device configured to provide user feedback such as a visual display (e.g., display 223), a speaker, a haptic feedback device, or the like Display 223 may include a light-emitting component, such as a light emitting diode (LED) or other component capable of providing a visible signal to a user. In some embodiments, display 223 includes at least one of a monitor, an LCD display, an LED display, a touch screen, a lamp, a projector, or another visual display.

Transceiver 224 may include a transceiver configured to connect with at least one of any type of cellular data network, or at least one of a Wi-Fi transceiver, a Li-Fi transceiver, Near Field Communication (NFC) transceiver, a radio transceiver, an ultra-high frequency (UHF) transceiver, a Bluetooth transceiver, an infrared transceiver, or other wireless transceiver.

Referring again to FIG. 2, memory 230 may be a volatile or non-volatile, magnetic, semiconductor, optical, removable, non-removable, or other type of storage device or tangible (i.e., non-transitory) computer-readable medium. Memory 230 may store one or more programs (e.g., modules, code, scripts, or functions) used to perform methods consistent with disclosed embodiments. Programs may include operating systems (not shown) that perform known operating system functions when executed by one or more processors. Disclosed embodiments may operate and function with computer systems running any type of operating system. Programs stored in memory 230 may be written in one or more programming or scripting languages. One or more of such software sections or modules of memory 230 can be integrated into a computer system, non-transitory computer-readable media, or existing communications software. The programs can also be implemented or replicated as firmware or circuit logic.

As shown, memory 230 may include programs 232 (e.g., modules, code, scripts, algorithms), submit a data processing request, analyze a dataset, run a data model, receive data modeling results, authenticate a user, create or edit a user profile, authenticate a user, record voice data, analyze voice data, capture image data, record video data, detect finger prints, send and receive data, display a message, play a message, generate haptic feedback, store data, and/or other functions consistent with disclosed embodiments.

Memory 230 includes data 234 comprised of at least one of encrypted data or unencrypted data. Data 234 may include datasets collected from external data sources outside system 100 (e.g., data downloaded from a third party website; data received from a remote device). Data 234 may include actual data or synthetic data. Data 234 may include information regarding data models, metadata, data labels, clustered datasets, data schema, statistical profiles, or other characteristics of the data. A label may indicate whether one or more data elements are actual data, synthetic data, relevant data, or another category of data. In some embodiments, data 234 includes a data index. In some embodiments, data 234 includes one or more databases comprising an organized or structured collection of tables, queries, objects, schema, reports, views, or the like.

Figure 3:
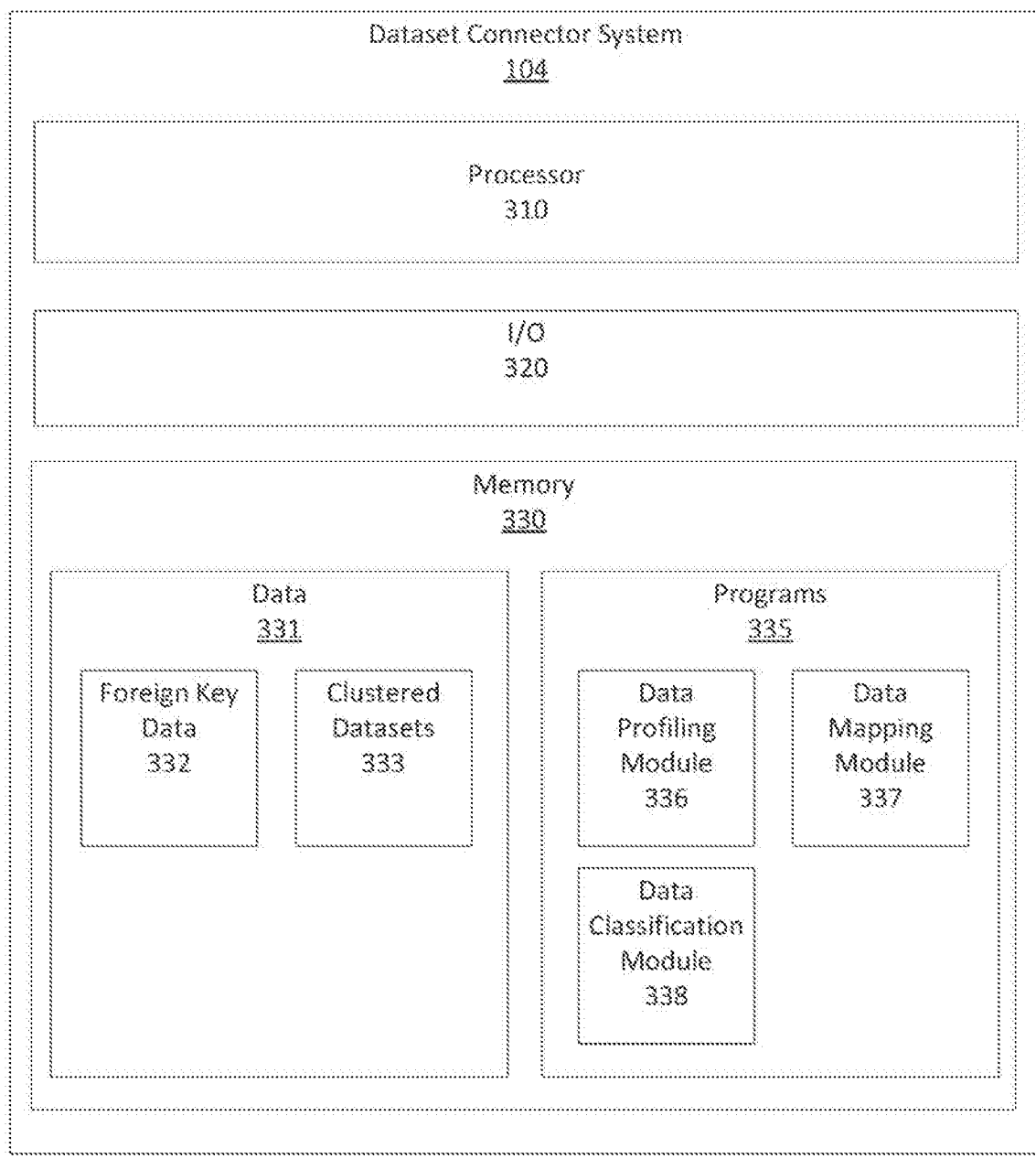
FIG. 3 is a diagram of a dataset connector system, consistent with disclosed embodiments.

FIG. 3 is a diagram of exemplary dataset connector system 104, consistent with disclosed embodiments. As shown, dataset connector system 104 includes one or more processors 310, one or more I/O devices 320, and one or more memory units 330. In some embodiments, some or all components of dataset connector system 104 may be hosted on a device, a computer, a server, a cluster of servers, or a cloud service. In some embodiments, dataset connector system 104 is a scalable system configured to efficiently manage resources and enhance security by provisioning computing resources in response to triggering events and terminating resources after completing a task (e.g., a scalable cloud service that spins up and terminates container instances).

Processors 310 may include one or more known computing processors, as described above. One of ordinary skill in the art would understand that other types of processor arrangements could be implemented that provide for the capabilities disclosed herein. The disclosed embodiments are not limited to any type of processor(s) configured in dataset connector system 104. Processor 310 may execute various instructions stored in memory 330 to perform various functions of the disclosed embodiments described in greater detail below. Processor 310 is configured to execute functions written in one or more programming languages.

I/O devices 320 may include components to connect to network 110 and to send data to and receive data from other components of system 100 (e.g., via a transceiver). I/O devices 320 may include at least one of a display, an LED, a router, a touchscreen, a keyboard, a microphone, a speaker, a haptic device, a camera, a button, a dial, a switch, a knob, a transceiver, an input device, an output device, or another I/O device to perform methods of the disclosed embodiments. I/O devices 320 may be components of an interface of dataset connector system 104, e.g., a user interface.

Still referring to FIG. 3, dataset connector system 104 may include memory 330, including one or more memory units, as described above. One or more software sections or modules of memory 330 can be integrated into a computer system, non-transitory computer-readable media, or existing communications software. The programs, modules, or code can also be implemented or replicated as firmware or circuit logic.

As shown, memory 330 may include data 331 and programs 335. In some embodiments, data 331 includes one or more databases comprising an organized or structured collection of tables, queries, objects, schema, reports, views, or the like. Data 331 may include stored data associated with a user or a user profile. As shown, data 331 includes foreign key data 332 and clustered datasets 333.

Foreign key data 332 may include a foreign key index comprising a list of known foreign keys. In some embodiments, foreign key data 332 includes an estimate of the likelihood that a data object is a unique foreign key. Foreign keys may be unique to a specific data element (e.g., a personal identifier, a social security number, or a universal unique identification (UUID)), or shared (e.g., a postal code, a date of birth, or a name). In some embodiments, foreign key data 332 may include a phone number, a transaction identifier, an account number, an address, a social security number, a medical record number, or a personal identifier.

Clustered datasets 333 may include datasets received from other components of system 100 (e.g., client device 102). Clustered datasets 333 may include communication data, user device data, health data, transactional data, transportation data, medical data, biological data, climate data, environmental data, educational data, demographic data, water data, government data, or other data. Clustered datasets 333 may include data describing datasets (e.g., a dataset index), including metadata, an indicator of whether data element is actual data or synthetic data, a data schema, a statistical profile, a relationship between datasets (e.g., node and edge data), or other descriptive information. Edge data may indicate a similarity between datasets (e.g., a measure of data overlap or statistical similarity) or a hierarchical relationship (e.g., a data lineage, a parent-child relationship). Clustered datasets 333 may include graphical data, such as a node diagram, a tree diagram, or a vector diagram of datasets.

Programs 335 may include programs (e.g., modules, code, scripts, or functions) to process data, consistent with disclosed embodiments. Programs 335 may be configured to perform a task in response to a triggering event. For example, in response to a triggering event such as the receipt of input data from one component of system 100 (e.g., from client device 102), programs 335 may be configured to generate (spin-up) an ephemeral container instance to perform one or more tasks. Programs 335 may be configured to assign a task to a previously generated container instance (i.e., a warm container instance). Programs 335 may include an Application Programming Interface (API). Programs 335 includes a data profiling module 336, a data mapping module 337, and a data classification module 338.

In some embodiments, modules of programs 335 (including data profiling module 336, data mapping module 337, and data classification module 338) are configured to retrieve a model from a model storage (e.g., model storage 106) or receive an optimized model from a model optimizer (e.g., model optimizer 108). In some embodiments, modules of programs 335 are configured to train machine learning models or optimize statistical models. In some embodiments, modules of programs 335 are configured to submit a model training request to a model optimizer, e.g., model optimizer 108. In some embodiments, modules of programs 335 are configured to process received datasets and/or to update stored datasets (e.g., stored clustered datasets 333).

Data profiling module 336 includes machine learning models and statistical models to determine the data schema and/or a statistical profile of a dataset, consistent with disclosed embodiments. Data profiling module 336 may include a generative adversarial network model, a recurrent neural network model, a convolutional neural network model, or other machine learning model. The machine learning models may be configured to determine a data schema of a dataset. For example, machine learning models of data profiling module 336 may include algorithms to determine a data type, key-value pairs, row-column data structure, or other property of a data schema.

In some embodiments, data profiling module 336 includes a regression model, a Bayesian model, a statistical model, a linear discriminant analysis model, or other classification model configured to determine one or more descriptive metrics of a dataset. For example, data profiling module 336 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset. Data profiling module 336 may be configured to implement univariate and multivariate statistical methods. The statistical model may be configured to return a statistical profile of a dataset. The statistical profile may include a plurality of descriptive metrics. In some embodiments, the statistical model may be configured to return a statistical similarity metric representing a measure of similarity between data in a dataset. The similarity metric may be based on a covariance matrix, a variance, a frequency of overlapping values, or other measure of statistical similarity.

Consistent with disclosed embodiments, data mapping module 337 includes machine learning models to generate edges between nodes, the nodes being datasets (i.e., cluster datasets, data mapping or data crawling). Machine learning models of data mapping module 337 may include at least one of a recurrent neural network model, a convolutional neural network model, a random forest model, a bag-of-words model, a multilayer perceptron model, a gated recurrent unit model, a seq2seq model, or other machine learning model.

In some embodiments, data mapping module 337 includes machine learning models or other models to identify foreign keys and maintain an index of foreign keys (e.g., a data crawler model). The foreign keys may be unique or shared, consistent with disclosed embodiments. The foreign keys may be stored in, for example, foreign key data 332. Data mapping module 337 may be configured to predict foreign keys by identifying candidate foreign keys and determining a foreign key score based on at least one of an index of foreign keys or a search of a dataset. For example, data mapping module 337 may be configured to determine a foreign key score based on a frequency of occurrence of a candidate foreign key in one or more datasets or based on a label associated with the candidate foreign key. As another example, data mapping module 337 may be capable of assigning a foreign key score to a candidate foreign key based on its occurrence in a data column that includes known foreign keys.

Data mapping module 337 may be configured to connect datasets (i.e., generate edges between datasets) based on at least one of a foreign key, a data schema, or a similarity metric. Edge data may include information indicating a similarity between datasets (e.g., a measure of data overlap, correlation, covariance, or other measure of statistical similarity) or a hierarchical relationship (e.g., derived data, parent-child relationships). Data mapping module 337 may be configured to receive a plurality of datasets and generate edges based solely on the received datasets. In some embodiments, Data mapping module 337 may be configured to receive a plurality of datasets and generate edges based on the received datasets and on stored, clustered datasets (e.g., datasets stored in clustered datasets 333).

In some embodiments, data mapping module 337 may be configured to generate a data mapping model and/or retrieve a data mapping model from model storage 106 based on output from data profiling module 336. Data mapping module 337 may be configured to identify and retrieve a data mapping model based on a statistical profile, a data schema, a model index, and/or a model search strategy. Consistent with disclosed embodiments, the search strategy may include a random search or a grid search. In some embodiments, data mapping module 337 may be configured to receive a plurality of datasets and retrieve a data mapping model previously used to generate edge data for one of the received datasets. Data mapping module 337 may be configured to retrieve a data mapping model previously used for a dataset that share features of a data schema of one of the received datasets. In some aspects, data mapping module 337 may be capable of retrieving a data mapping model used for a dataset having a statistical similarity metric with one of the received datasets that meets a threshold criterion.

Data classification module 338 may include machine learning models to classify datasets based on the data schema, statistical profile, and/or edges. Data classification module is configured to segment datasets (i.e., classify some or all data within a dataset, marking or labeling data (e.g., as duplicate), clean a dataset, format a dataset, or eliminate some or all data within a dataset based on classification). Machine learning models of the data classification module 338 may include a convolutional neural network, a random forest model, a recurrent neural network model, a support vector machine model, or another machine learning model. The models may be configured to classify data elements as actual data, synthetic data, relevant data for an analysis goal or topic, derived data, or other data category.

Data classification module 338 may be configured to classify data based on at least one of an edge, a foreign key, a data schema, or a statistical metric, consistent with disclosed embodiments. For example, data classification module 338 may classify data in a dataset as synthetic data based on a foreign key that matches a known foreign key of a synthetic dataset. As another example, data classification module may classify data in a dataset as a derived dataset based on determination that a similarity metric between the dataset and a previously classified dataset satisfies a criterion.

In some embodiments, data classification module 338 is configured to generate a data classification model and/or retrieve a data classification model from model storage 106. Data classification module 338 may be configured to identify and retrieve a model based on a statistical profile, a data schema, a model index, and/or a model search strategy. Consistent with disclosed embodiments, the search strategy may include a random search or a grid search. In some embodiments, data classification module 338 may be configured to receive a plurality of datasets and retrieve a data classification model previously used to classify data in one of the received datasets. Data classification module 338 may be configured to retrieve a model previously used to classify a dataset that share features of a data schema of one of the received datasets. In some aspects, data classification module 338 may be capable of retrieving a data classification model used for a dataset having a statistical similarity metric with one of the received datasets that meets a threshold criterion.

Figure 4:
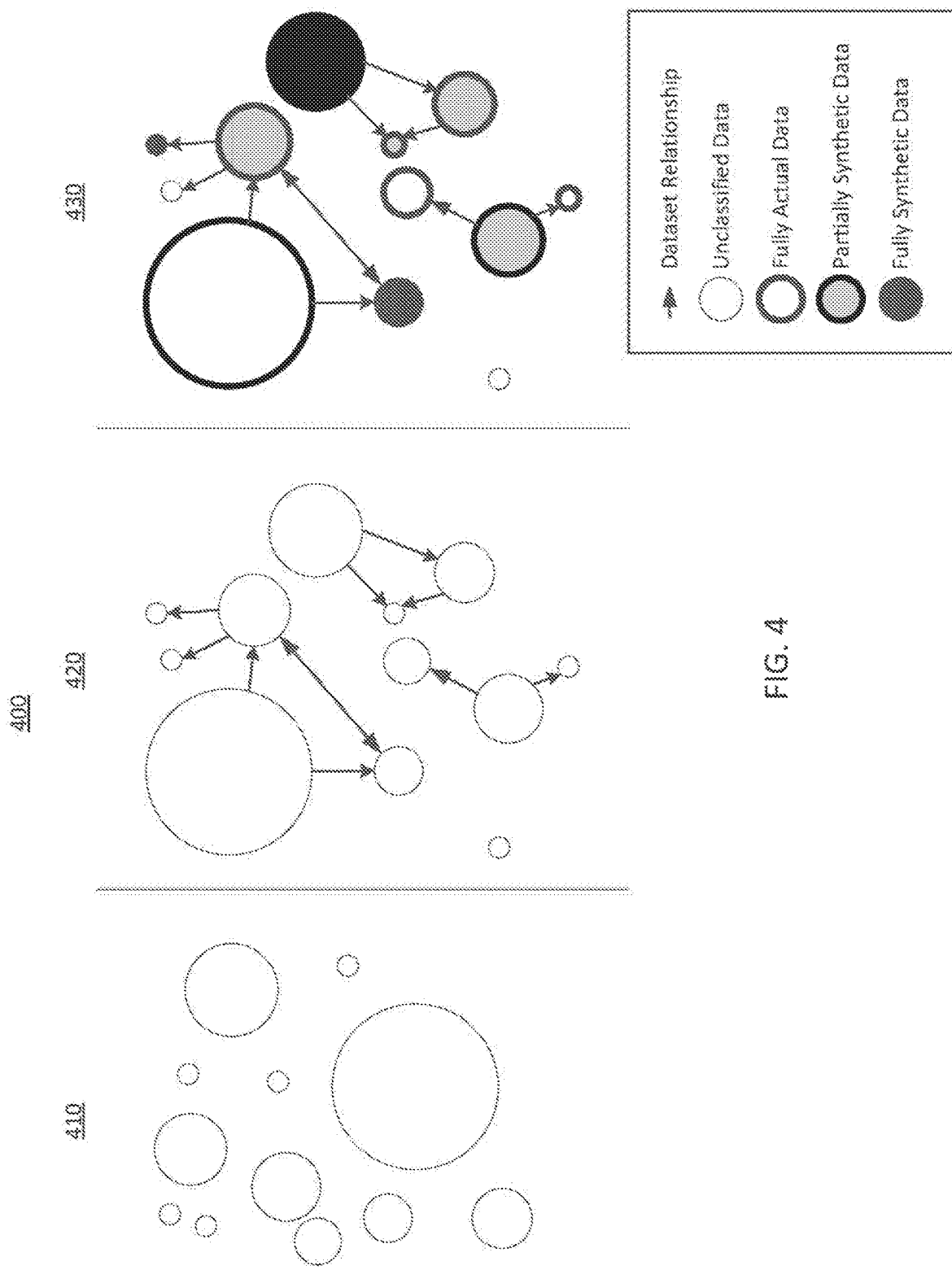
FIG. 4 is an illustration of an exemplary dataset connector process, consistent with disclosed embodiments.

FIG. 4 is an illustration of exemplary dataset connector process 400 comprising phases 410, 420, and 430, shown as node diagrams, consistent with disclosed embodiments. As shown, FIG. 4 represents nodes (datasets) as discs, the size of the disc indicating a relative size of a dataset. Arrows and distance between discs represent aspects of data relationships between the datasets. Shading represents classification of the datasets. At the beginning of process 400, the data schema, statistical profile, edge values, and data classification of a dataset may be either known or unknown. FIG. 4 is provided for purposes of illustration only and, as one of skill in the art will appreciate, other dataset connector processes of varying complexity are possible, consistent with disclosed embodiments. For example, in the embodiments, the number and type of datasets, dataset relationships, and/or classifications may differ from the illustration in FIG. 4.

Phase 410 is a data profiling phase, consistent with disclosed embodiments. In phase 410, dataset connector system 104 may receive a plurality of datasets. In some embodiments, dataset connector system 104 may receive the datasets from client device 102 and/or stored clustered datasets 333. During phase 410, dataset connector system 104 may determine a respective data schema and/or a statistical profile of the received datasets using data profiling module 336, consistent with disclosed embodiments.

Phase 420 is a data mapping phase (clustering phase), consistent with disclosed embodiments. In phase 420, dataset connector system 104 may use data mapping module 337 to determine foreign key scores of data elements in the plurality of datasets, consistent with disclosed embodiments. Also performed during phase 420, data mapping module 337 may generate edges for the datasets as illustrated by the arrows and the changed distance between nodes (datasets). Arrows illustrate examples of edges in FIG. 4, wherein the direction of the arrow indicates a hierarchical relationship (e.g., a data lineage, a parent-child), with double-headed arrows indicating a weak or ambiguous hierarchy. For purposes of illustration, the distance between datasets may reflect a similarity metric of the between datasets, with closer nodes being more statistically similar than further nodes. As shown, a given dataset may be related to no other datasets in a cluster (no arrows). In some cases, a dataset may be related to one or more other datasets (one or more arrows).

Phase 430 is a data classification phase, consistent with disclosed embodiments. During phase 430, dataset connector system 104 may use data classification module 338 to classify datasets based on the data schema, statistical profile, and/or edges. As illustrated by way of example, at the end of phase 430, datasets may be unclassified. In some implementations, datasets may be classified as fully composed of actual data, fully composed of synthetic data, or partially composed of synthetic data. Consistent with disclosed embodiments, other classification outcomes are possible, and a dataset or individual data elements within a dataset may be classified in any category during phase 430.

Figure 5:
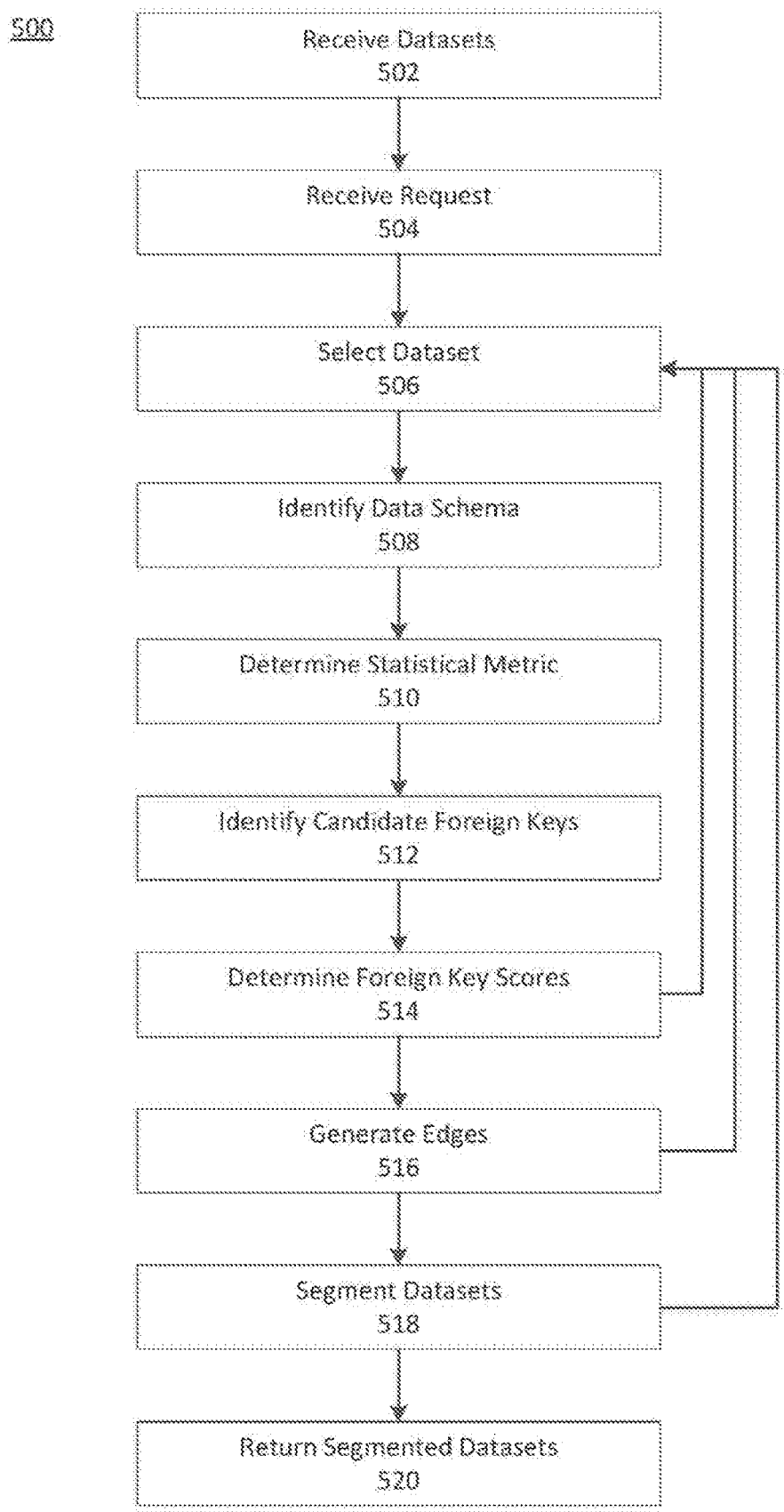
FIG. 5 is a diagram of an exemplary process for connecting datasets, consistent with disclosed embodiments.

FIG. 5 is a diagram of exemplary process 500 for connecting datasets, consistent with disclosed embodiments. In some embodiments, dataset connector system 104 may perform process 500 on received datasets or on stored datasets, consistent with disclosed embodiments. The stored datasets may be associated with a user profile. As one of skill in the art will appreciate, the order of steps of process 500 may vary, and, in some embodiments, steps of process 500 may be skipped. Further, in some embodiments, machine learning models may perform steps of process 500 concurrently. Consistent with disclosed embodiments, steps of process 500 may include training at least one of a data profiling model, a data mapping model, or a data classification model.

Consistent with disclosed embodiments, steps of process 500 may be performed on one or more cloud services using one or more ephemeral container instances. For example, at any of the steps of process 500, dataset connector system 104 may generate (spin up) an ephemeral container instance to execute a task, assign a task to an already-running ephemeral container instance (warm container instance), or terminate a container instance upon completion of a task.

At step 502, dataset connector system 104 may receive a plurality of datasets, consistent with disclosed embodiments. For example, dataset connector system 104 may receive a plurality of datasets from at least one of client device 102, clustered datasets 333, or another remote device. Receiving the plurality of datasets at step 502 may be performed as part of an API call. Step 502 may be a triggering event that causes dataset connector system 104 to generate an ephemeral container instance to perform other steps of process 500. Step 502 may include receiving a dataset index, a data label, a foreign key, or a foreign key index. The label may indicate whether one or more data elements are actual data, synthetic data, relevant data, or another category of data. The dataset index may include metadata, an indicator of whether data element is actual data or synthetic data, a data schema, a statistical profile, a data label, a relationship between datasets (e.g., node and edge data), or other descriptive information.

At step 504, dataset connector system 104 may receive a request to segment a cluster of connected datasets among the received plurality of datasets, consistent with disclosed embodiments. The request may include instructions to segment data (classify or remove data based on a classification). The request may include a request to return clustered datasets and/or to store the clustered datasets in a data storage (e.g., clustered data 333). Step 504 may be a triggering event that causes dataset connector system 104 to generate an ephemeral container instance to perform other steps of process 500. The request may include a statement indicating an analysis goal or topic (i.e., a desired outcome). The request may include information associated with a user profile (e.g., a user name, a password, and/or an authentication criterion), and set 504 may include authenticating a user based on the received information.

At step 506, dataset connector system 104, may select a dataset from among the received plurality of datasets, consistent with disclosed embodiments. Step 506 may include determining, by the data connector system, that the selected dataset belongs to a previously segmented cluster of connected datasets. The selected dataset may be selected based on a foreign key or a data label (e.g., a label classifying the dataset as relevant to an analysis goal or topic.

At step 508, data profiling module 336 may identify a data schema of the selected dataset, consistent with disclosed embodiments. The data schema may include at least one of a data type, key-value pair, a label, metadata, a field, a relationship, a view, an index, a package, a procedure, a function, a trigger, a sequence, a synonym, a link, a directory, a queue, or the like. In some embodiments, at step 508, data profiling module 336 may identify a data schema for a subset of the received plurality of datasets or for each of the received plurality of datasets.

To identify the data schema, data profiling module 336 may implement a data profiling model at step 508, consistent with disclosed embodiments. The data profiling model may include at least one of a generative adversarial network model, a recurrent neural network model, a convolutional neural network model, or other machine learning model. Step 508 may include retrieving the data profiling model from or storing the data profiling model in a model storage. The retrieving may be based on a model index and a labelled dataset.

At step 510, data profiling module 336 may determine a statistical metric of the selected dataset, consistent with disclosed embodiments. For example, step 510 may include determining an average, a mean, a standard deviation, a range, a moment, a variance, a covariance, a covariance matrix or any other statistical metric of the selected dataset. In some embodiments, at step 510, data profiling module 336 may determine a statistical metric for a subset of the received plurality of datasets or for each of the received plurality of datasets.

Data profiling module 336 may implement a data profiling model at step 510, which may be the same data profiling model of step 508 or a different data profiling model. Step 510 may include retrieving, storing, and/or training the data profiling model.

At step 512, data profiling module 336 identifies a plurality of candidate foreign keys of the selected dataset, consistent with disclosed embodiments. Step 512 may include identifying the plurality of candidate foreign keys based on at least one of a foreign key index or a search of the plurality of received datasets. The foreign key index may be retrieved from foreign key data 332. In some embodiments, at step 512, data profiling module 336 may identify a plurality of candidate foreign keys of a subset of the received plurality of datasets or of each of the received plurality of datasets.

Data profiling module 336 may implement a data profiling model at step 512, which may be the same data profiling model of steps 508 and/or 510 or a different data profiling model. Step 512 may include retrieving, storing, and/or training the data profiling model, consistent with disclosed embodiments.

At step 514, data mapping module 337 may determine a respective foreign key score for each of the plurality of candidate foreign keys, consistent with disclosed embodiments. Step 514 may include updating a foreign key index based on one of the respective foreign key scores. The foreign key index may be stored in foreign key data 332.

Data mapping module 337 may implements a data mapping model at step 514. The data mapping model of step 514 may comprise at least one of a convolutional neural network model or a random forest model. Step 514 may include retrieving the data mapping model from a model storage and/or storing the data mapping model in a model storage. The retrieving may be based on a model index, a labelled dataset, or a candidate foreign key. Step 512 may include training the data mapping model using the received datasets and/or reference datasets.

As shown in FIG. 5, step 506 may follow step 514, and the dataset connector system 104 may select a new dataset at step 506 and repeat steps 508 to 514 for the new dataset. The dataset connector system may repeat steps 506 through 514 a number of times (e.g., once for multiple ones of or all of the datasets in the plurality of received datasets).

At step 516, data classification module 338 generates a plurality of edges between the selected dataset and the received plurality of datasets based on the foreign key scores, the data schema, and the statistical metric, consistent with disclosed embodiments. An edge may comprise an indicator of a hierarchical relationship (e.g., a data lineage, parent-child relationship, derived data, an ambiguous hierarchy). An edge may include an overlap score indicating the amount of overlap between datasets. In some embodiments, at step 516, data classification module 338 may generate a plurality of edges between each of a subset of the received plurality of datasets or between each of the received plurality of datasets.

Data classification module 338 may implement a data classification model at step 516, consistent with disclosed embodiments. The data classification model may include at least one of a convolutional neural network, a random forest model, a recurrent neural network model, a support vector machine model, or another machine learning model. Step 516 may include retrieving the data classification model from a model storage and/or storing the data classification model in a model storage. The retrieving may be based on a model index and a labelled dataset. Step 516 may include training the data classification model using the received datasets and/or reference datasets.

As shown in FIG. 5, step 506 may follow step 516, and the dataset connector system 104 may select a new dataset at step 506 and repeat steps 508 to 516 for the new dataset. The dataset connector system may repeat steps 506 through 516 a number of times (e.g., once for multiple ones of or all of the datasets in the plurality of received datasets). In some embodiments, step 516 may be repeated for a number of datasets without returning to step 506.

At step 518, data classification module 338 may segment a cluster of connected datasets comprising the selected dataset based on the plurality of edges, consistent with disclosed embodiments. In some embodiments, the segmenting may be based on at least one of a statistical metric, a data schema, a foreign key, a data label, an analysis goal, or an analysis topic. The label may indicate that a data element is actual data, synthetic data, relevant data, or another category of data. Step 518 may include determining or receiving an indication that the selected dataset belongs to a previously segmented cluster of connected datasets and may include updating the previously segmented cluster of connected datasets. In some embodiments, at step 518, data classification module 338 may segment a subset of the received plurality of datasets or segments each of the received plurality of datasets.

In some embodiments, segmenting the cluster of connected datasets at step 518 includes labelling data in the cluster of connected datasets. In some embodiments, segmenting includes removing data based on a label. For example, step 518 may include removing data that is labelled as at least one of synthetic data, derived data, or irrelevant data. In some embodiments, a received dataset in the cluster of connected datasets may comprise labelled data, and the segmenting at step 520 may be based on the received, labelled data.

Segmenting at step 518 may be based on a received instruction. For example, segmenting may be based on an instruction received at step 504. The instruction may include a command to remove one of overlapping data, derived data, synthetic data, or actual data.

The data classification module 338 implements a data classification model at step 518, which may be the same data classification model of step 516 or a different model, consistent with disclosed embodiments. Step 518 may include retrieving, storing, and/or training the data classification model.

As shown in FIG. 5, step 506 may follow step 518, and the dataset connector system 104 may select a new dataset at step 506 and repeat steps 506 to 518 for the new dataset. The dataset connector system may repeat steps 506 through 518 a number of times (e.g., once for multiple ones of or all of the datasets in the plurality of received datasets). In some embodiments, step 518 is repeated for a number of datasets without returning to step 506.

At step 520, dataset connector system 104 may return the segmented cluster of connected datasets. In some embodiments, step 520 includes at least one of transmitting, to client device 102, the segmented cluster of datasets or storing the segmented cluster of datasets in a data storage (e.g., clustered datasets 333). Storing the segmented cluster of datasets may include updating at least one of a data label (metadata), a foreign key index, or a dataset index. Step 520 may include returning a graphical representation of the cluster of connected datasets.

Figure 6:
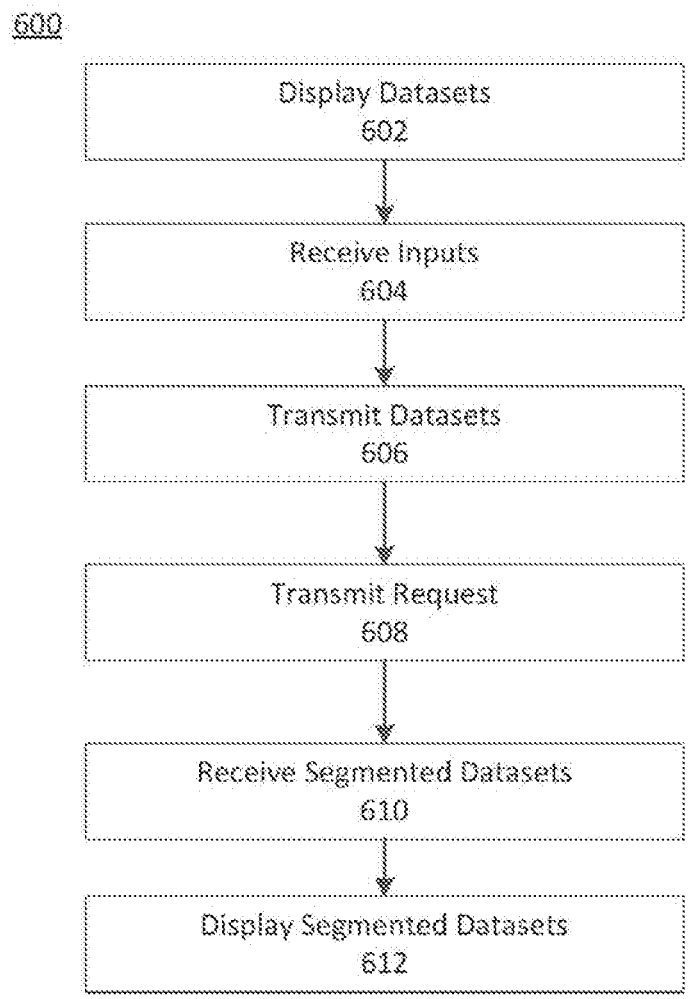
FIG. 6 is a diagram of an exemplary process for segmenting datasets, consistent with disclosed embodiments.

FIG. 6 is a diagram of exemplary process 600 for segmenting datasets, consistent with disclosed embodiments. In some embodiments, client device 102 may perform process 600. Process 600 may be performed based on user inputs or, in some embodiments, process 600 is executed automatically by a program, script, or routine. For example, process 600 may be performed according to a schedule or in response to a triggering event (e.g., following receipt of data).

At step 602, client device 102 may display information about a plurality of datasets on a display (e.g., display 223). For example, client device 102 may display a data table, a node diagram, a tree diagram, a vector diagram, or other graphical representation of a plurality of datasets.

At step 604, client device 102 may receive inputs, consistent with disclosed embodiments. Client device 102 may receive inputs via, for example, I/O devices 220 (e.g., input device 221). The inputs may comprise a command to segment the datasets based on a data classification. The inputs may include, for example, a command to segment actual data, synthetic data, overlapping data, relevant data, or the like.

At step 606, client device 102 may transmit a plurality of datasets to dataset connector system 104, consistent with disclosed embodiments. Step 606 may be performed as part of an API call. Step 606 may include transmitting a dataset index, a data label (metadata), a foreign key, or a foreign key index. The dataset index may include including metadata, an indicator of whether data element is actual data or synthetic data, a data schema, a statistical profile, a relationship between datasets (e.g., node and edge data), or other descriptive information. Step 606 may cause dataset connector to implement process 600.

At step 608, client device 102 may transmit a request to dataset connector system 104, consistent with disclosed embodiments. The request may include instructions to segment data (classify or remove data based on a classification). The request may include a request to return clustered datasets and/or to store the clustered datasets in a data storage (e.g., clustered data 333). The request may include a statement indicating an analysis goal or topic. Step 608 may cause dataset connector to implement process 600. The request may include information associated with a user profile including a user name, a password, and/or an authentication criteria.

At step 610, client device 102 may receive a cluster of segmented datasets from dataset connector system 104, consistent with disclosed embodiments. The segmenting may be based on at least one of a statistical metric, a data schema, a foreign key, an analysis goal or topic, or a data label (metadata). Receiving segmented datasets may include receiving at least one of an edge, a foreign key, a data schema, or a statistical metric.

At step 612, client device 612 may display the segmented datasets, consistent with disclosed embodiments. For example, client device 102 may display a data table, a node diagram, a tree diagram, a vector diagram, or other graphical representation of the segmented datasets.

Systems and methods disclosed herein involve unconventional improvements over conventional data processing approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

Computer programs based on the written description and methods of this specification are within the skill of a software developer. The various functions, scripts, programs, or modules can be created using a variety of programming techniques. For example, programs, scripts, functions, program sections or program modules can be designed in or by means of languages, including JAVASCRIPT, C, C++, JAVA, PHP, PYTHON. RUBY, PERL, BASH, or other programming or scripting languages. One or more of such software sections or modules can be integrated into a computer system, non-transitory computer-readable media, or existing communications software. The programs, modules, or code can also be implemented or replicated as firmware or circuit logic.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A dataset connector system comprising:
one or more memory units storing instructions; and
one or more processors that execute the instructions to perform operations comprising:
receiving, by the dataset connector system, a plurality of datasets;
receiving, by the dataset connector system, a request to identify a cluster of connected datasets among the received plurality of datasets;
selecting, by the dataset connector system, a dataset from among the received datasets;
identifying, by a data profiling model, a plurality of candidate foreign keys of the selected dataset;
identifying a data mapping model based on at least one of a statistical profile, a data schema, a model index, or a model search strategy;
determining, by the identified data mapping model, respective foreign key scores corresponding to the candidate foreign keys, the foreign key scores being based on an occurrence frequency of at least one of the candidate foreign keys in the datasets;
generating, by the identified data mapping model, a plurality of edges between the selected dataset and the received plurality of datasets, the edges being generated based on the foreign key scores;
generating, by a data classification model and based on the edges, a cluster of connected datasets comprising the selected dataset;
segmenting the cluster of connected datasets, the segmenting being based on at least one of a statistical metric, a data schema, a foreign key, a data label, an analysis goal, or an analysis topic;
returning, by the dataset connector, the segmented cluster of connected datasets; and
updating at least one of the data profiling model, the data mapping model, or the data classification model using the received plurality of datasets.

2. The system of claim 1, the operations further comprising generating edge data comprising at least one measure of statistical similarity associated with the cluster of connected datasets.

3. The system of claim 1, the operations further comprising generating a dataset index corresponding to the cluster of connected datasets.

4. The system of claim 3, wherein the dataset index comprises at least one of an indicator of whether data element is actual data or synthetic data, a data schema, a statistical profile, a data label, node data, or edge data.

5. The system of claim 1, wherein at least one of the data profiling model, the data mapping model, or the data classification model comprises a machine learning model.

6. The system of claim 1, the operations further comprising receiving, by the dataset connector system, a label identifying at least one of the plurality of datasets as actual data, synthetic data, or relevant data.

7. The system of claim 6, wherein the selected dataset is selected based on the label.

8. The system of claim 1, wherein:
the determining of the respective foreign key scores is based on an index of foreign keys; and the operations further comprise updating a foreign key index based on at least one of the foreign keys.

9. The system of claim 1, wherein:
the operations further comprise generating, by the data profiling model, a statistical metric of the selected dataset; and
the data mapping model is identified based on the statistical metric.

10. The system of claim 1, the operations further comprising generating, based on the received request, an ephemeral container instance to perform at least one of the operations.

11. A method for connecting datasets via a computer-implemented dataset connector system, comprising:
receiving, by the dataset connector system, a plurality of datasets;
receiving, by the dataset connector system, a request to identify a cluster of connected datasets among the received plurality of datasets;
selecting, by the dataset connector system, a dataset from among the received datasets;
identifying, by a data profiling model, a plurality of candidate foreign keys of the selected dataset;
identifying a data mapping model;
determining, by the identified data mapping model, respective foreign key scores corresponding to the candidate foreign keys;
generating, by the identified data mapping model, a plurality of edges between the selected dataset and the received plurality of datasets, the edges being generated based on the foreign key scores;
generating, by a data classification model and based on the edges, a cluster of connected datasets comprising the selected dataset;
segmenting the cluster of connected datasets, the segmenting being based on at least one of a statistical metric, a data schema, a foreign key, a data label, an analysis goal, or an analysis topic;
returning, by the dataset connector, the segmented cluster of connected datasets; and
updating at least one of the data profiling model, the data mapping model, or the data classification model using the received plurality of datasets.

12. The method of claim 11 further comprising generating a dataset index corresponding to the cluster of connected datasets.

13. The method of claim 12, wherein the dataset index comprises at least one of an indicator of whether data element is actual data or synthetic data, a data schema, a statistical profile, a data label, node data, or edge data.

14. The method of claim 11 further comprising receiving, by the dataset connector system, a label identifying at least one of the plurality of datasets as actual data, synthetic data, or relevant data.

15. The method of claim 14, wherein the selected dataset is selected based on the label.

16. A method for connecting datasets comprising:
receiving a request to identify a cluster of connected datasets among a plurality of datasets;
selecting a dataset from among the datasets;
identifying, by a data profiling model, a plurality of candidate foreign keys of the selected dataset;
identifying a data mapping model;
determining, by the identified data mapping model, respective foreign key scores corresponding to the candidate foreign keys;
generating, by the identified data mapping model, a plurality of edges between the selected dataset and the received plurality of datasets, the edges being generated based on the foreign key scores;
generating, by a data classification model and based on the edges, a cluster of connected datasets comprising the selected dataset;
segmenting the cluster of connected datasets, the segmenting being based on at least one of a statistical metric, a data schema, a foreign key, a data label, an analysis goal, or an analysis topic; and
returning a graphical representation of the segmented cluster of connected datasets.

17. The method of claim 16 further comprising returning the cluster of connected datasets.

18. The method of claim 16 further comprising generating a dataset index corresponding to the cluster of connected datasets.

19. The method of claim 18, wherein the dataset index comprises at least one of an indicator of whether data element is actual data or synthetic data, a data schema, a statistical profile, a data label, node data, or edge data.

20. The method of claim 19, wherein:
the dataset index comprises edge data; and
segmenting the cluster of connected datasets is based on the edge data.

* * * * *